(12) United States Patent
Yamauchi et al.

(10) Patent No.: US 11,919,522 B2
(45) Date of Patent: Mar. 5, 2024

(54) APPARATUS AND METHOD FOR DETERMINING STATE

(71) Applicant: TOYOTA JIDOSHA KABUSHIKI KAISHA, Toyota (JP)

(72) Inventors: Koichiro Yamauchi, Tokyo-to (JP); Shunichiroh Sawai, Tokyo-to (JP); Takuya Sakata, Tokyo-to (JP); Masataka Sano, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 17/331,724

(22) Filed: May 27, 2021

(65) Prior Publication Data

US 2021/0370956 A1 Dec. 2, 2021

(30) Foreign Application Priority Data

Jun. 1, 2020 (JP) ................................. 2020-095671

(51) Int. Cl.
*B60W 40/09* (2012.01)
*B60W 40/072* (2012.01)
*G06V 20/59* (2022.01)

(52) U.S. Cl.
CPC .......... *B60W 40/09* (2013.01); *B60W 40/072* (2013.01); *G06V 20/597* (2022.01); *B60W 2540/225* (2020.02); *B60W 2540/30* (2013.01)

(58) Field of Classification Search
CPC .. B60W 40/072; B60W 40/076; B60W 40/08; B60W 40/09; B60W 50/14;

(Continued)

(56) References Cited

U.S. PATENT DOCUMENTS

2014/0139655 A1* 5/2014 Mimar ............... G08B 21/0476
340/575
2015/0109429 A1 4/2015 Inoue et al.
(Continued)

FOREIGN PATENT DOCUMENTS

CN 109758167 A 5/2019
JP H07-096768 A 4/1995
(Continued)

OTHER PUBLICATIONS

Shinji Ishida, et al., "Influence of Chevron Alignment Sign at Curve Section on Eye Behavior of Drivers", JSTE Journal of Traffic Engineering, 2020, vol. 6 Issue 1 p. 1-10, Japan, Japan Society of Traffic Engineers, https://doi.org/10.14954/jste.6.1_1 (Jan. 1, 2020).

(Continued)

*Primary Examiner* — Peter D Nolan
*Assistant Examiner* — Ce Li Li
(74) *Attorney, Agent, or Firm* — Dickinson Wright, PLLC (57) ABSTRACT

An apparatus for determining a state includes a processor configured to, when a movement area in which movement values indicating looking directions or face orientations of a driver of a vehicle are distributed is included in a predetermined area, determine that the driver is in a state of careless driving, and enlarge the predetermined area in accordance with a road condition around the vehicle. A method for determining a state includes, when a movement area in which movement values indicating looking directions or face orientations of a driver of a vehicle are distributed is included in a predetermined area, determining that the driver is in a state of careless driving, and enlarging the predetermined area in accordance with a road condition around the vehicle.

7 Claims, 6 Drawing Sheets

(58) Field of Classification Search
CPC ..... B60W 2040/0872; B60W 2420/42; B60W 2520/10; B60W 2540/225; B60W 2540/229; B60W 2540/30; B60W 2552/30; B60W 2556/50; G06F 3/012; G06F 3/013; G06V 20/56; G06V 20/597; G06V 40/161; G06V 40/193; G08B 21/06; G08B 29/185
See application file for complete search history.

(56) References Cited

U.S. PATENT DOCUMENTS

| | | | |
|---|---|---|---|
| 2019/0135295 A1 | 5/2019 | Sato et al. | |
| 2019/0143993 A1* | 5/2019 | Aoi | G06V 20/597 |
| | | | 340/439 |

FOREIGN PATENT DOCUMENTS

| | | | |
|---|---|---|---|
| JP | 4186749 B2 | * | 11/2008 |
| JP | 2009-244959 A | | 10/2009 |
| JP | 2009244959 A | * | 10/2009 |
| JP | 2010257293 A | * | 11/2010 |
| JP | 2014016702 A | | 1/2014 |
| JP | 2017151693 A | | 8/2017 |

OTHER PUBLICATIONS

Akihiro Hirashima, et al., "Extraction of Driver's Regions of Interest Using Saliency Map with Optical Flow Features", 33rd Fuzzy System Symposium, Japan, Japan Society for Fuzzy Theory and Intelligent Informatics, 2017, p. 553-558, https://doi.org/10.14864/fss.33.0_553.

* cited by examiner

APPARATUS AND METHOD FOR DETERMINING STATE

CROSS-REFERENCE TO RELATED APPLICATION

This application claims priority to Japanese Patent Application No. 2020-095671 filed on Jun. 1, 2020, and is incorporated herein by reference in its entirety.

FIELD

The present disclosure relates to an apparatus and a method for determining the state of a vehicle driver.

BACKGROUND

A state in which a vehicle driver is carelessly driving increases the risk of a traffic accident. A technique has been proposed that determines whether a driver is in a state of careless driving, based on movements of the driver indicated by, for example, his/her looking directions or face orientations.

Japanese Unexamined Patent Publication No. 2017-151693 describes a system that accurately detects a state in which a vehicle driver is carelessly driving. This system detects variations in the face orientation of the vehicle driver, based on image data of the driver's face, and determines whether the driver is in a state of careless driving, based on these variations and the driving scene of the vehicle.

SUMMARY

A driver makes different movements, depending on road conditions. For this reason, determination of a state of careless driving based on a single criterion may not lead to appropriate detection of careless driving.

It is an object of the present disclosure to provide an apparatus that can appropriately determine the state of driving of a vehicle driver.

According to the present disclosure, an apparatus for determining a state includes a processor configured to, when a movement area in which movement values indicating looking directions or face orientations of a driver of a vehicle are distributed is included in a predetermined area, determine that the driver is in a state of careless driving, and enlarge the predetermined area in accordance with a road condition around the vehicle.

The processor of the apparatus according to the present disclosure is preferably configured to enlarge, in accordance with the road condition that there is a curve ahead of the vehicle, the predetermined area toward the curve.

The processor of the apparatus according to the present disclosure is preferably configured to enlarge the predetermined area to a larger extent as the radius of curvature of the curve decreases.

The processor of the apparatus according to the present disclosure is preferably configured to enlarge, in accordance with the road condition that the inclination of a road changes ahead of the vehicle, the predetermined area toward a side on which the inclination changes.

The processor of the apparatus according to the present disclosure is preferably configured to enlarge, in accordance with the road condition that an object will be detected ahead of the vehicle, the predetermined area in a direction from the position of the driver to a position where the object will be detected.

The processor of the apparatus according to the present disclosure is preferably configured to enlarge the predetermined area to a larger extent as the speed of the vehicle increases.

According to the present disclosure, a method for determining a state includes, when a movement area in which movement values indicating looking directions or face orientations of a driver of a vehicle are distributed is included in a predetermined area, determining that the driver is in a state of careless driving, and enlarging the predetermined area in accordance with a road condition around the vehicle.

The apparatus according to the present disclosure can appropriately determine the state of driving of a vehicle driver.

DESCRIPTION OF EMBODIMENTS

Hereinafter, an apparatus that can appropriately determine the state of driving of a vehicle driver will be explained in detail with reference to the accompanying drawings. When a movement area in which movement values indicating looking directions or face orientations of a driver of a vehicle are distributed is included in a predetermined area, the apparatus determines that the driver is in a state of careless driving. The apparatus then enlarges the predetermined area in accordance with the road condition around the vehicle.

Figure 1:
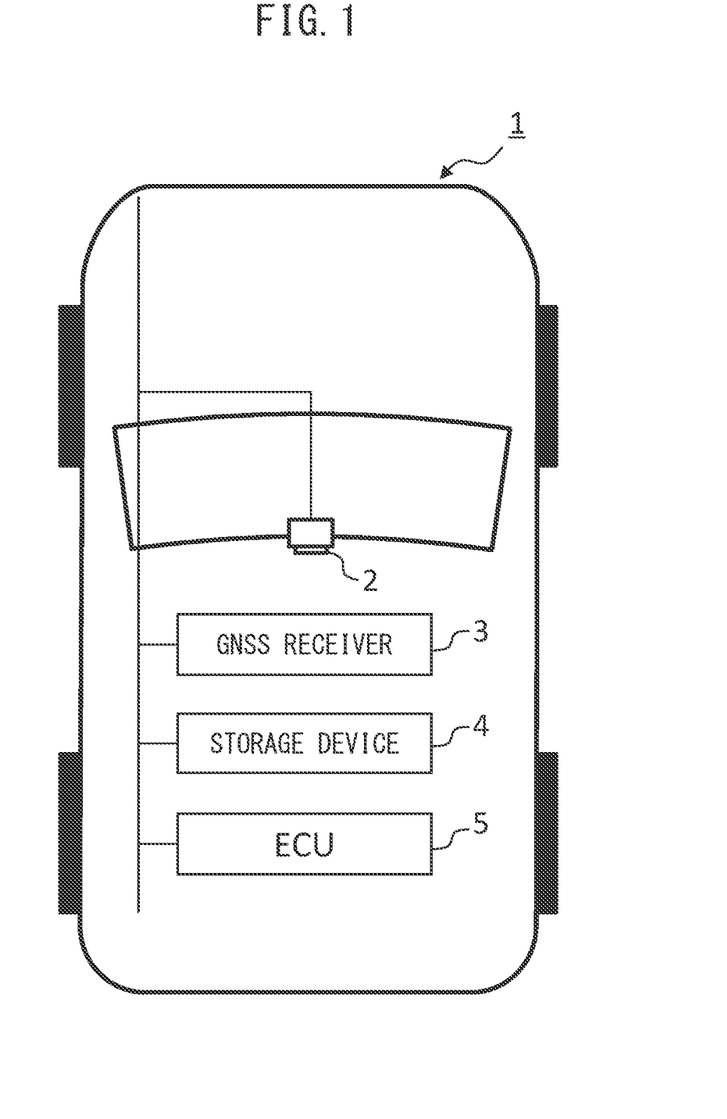
FIG. 1 schematically illustrates the configuration of a vehicle including an apparatus for determining a state.

FIG. 1 schematically illustrates the configuration of a vehicle including an apparatus for determining a state.

The vehicle 1 includes a driver monitoring camera 2, a global navigation satellite system (GNSS) receiver 3, a storage device 4, and an electronic control unit (ECU) 5. The driver monitoring camera 2, the GNSS receiver 3, and the storage device 4 are connected to the ECU 5 so that they can communicate via an in-vehicle network conforming to a standard, such as a controller area network.

The driver monitoring camera 2 is an example of a sensor for detecting movements of a driver. The driver monitoring camera 2 includes a two-dimensional detector constructed from an array of optoelectronic transducers, such as CCD or C-MOS, having sensitivity to infrared light and a focusing optical system focusing an image of a target region on the two-dimensional detector. The driver monitoring camera 2 also includes a light source that emits infrared light. The driver monitoring camera 2 is mounted, for example, in a front and upper area inside the vehicle so as to be oriented toward the face of the driver sitting on the driver seat. The driver monitoring camera 2 irradiates the driver with infrared light every predetermined capturing period (e.g. 1/30 to 1/10 seconds), and outputs an image showing the driver's face.

The GNSS receiver 3 receives a GNSS signal from a GNSS satellite every predetermined period, and determines the position of the vehicle 1, based on the received GNSS signal. The GNSS receiver 3 outputs a positioning signal indicating the result of determination of the position of the vehicle 1 based on the GNSS signal to the ECU 5 via the in-vehicle network every predetermined period.

The storage device 4, which is an example of a storage unit, includes, for example, a hard disk drive or a nonvolatile semiconductor memory. The storage device 4 stores map information including road conditions in association with positions. The storage device 4 reads out the road conditions in response to a request for doing so from the ECU 5, and passes the read-out road conditions to the ECU 5 via the in-vehicle network.

The ECU 5, which is an example of the apparatus for determining a state, executes a process for determining a state (hereafter, a "state determining process"), using images generated by the driver monitoring camera 2, positioning signals generated by the GNSS receiver 3, and the map information stored in the storage device 4.

Figure 2:
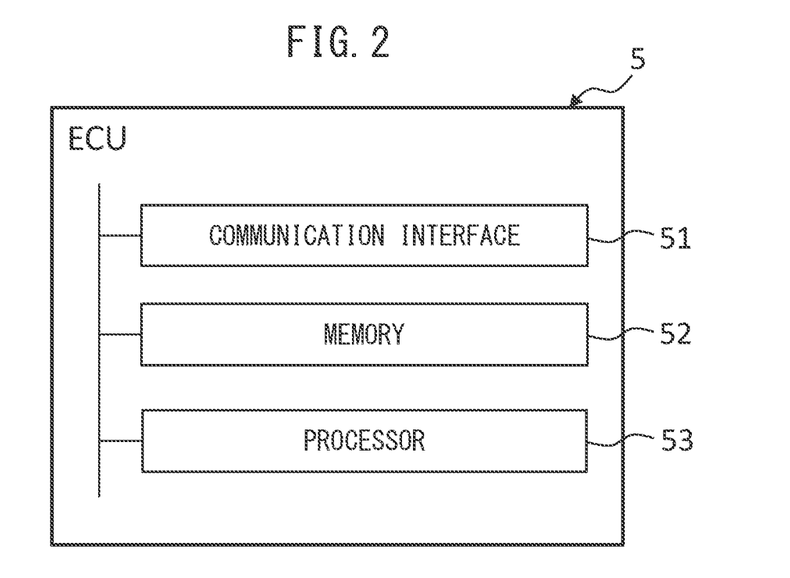
FIG. 2 schematically illustrates the hardware of an ECU.

FIG. 2 schematically illustrates the hardware of the ECU 5. The ECU 5 includes a communication interface 51, a memory 52, and a processor 53.

The communication interface 51, which is an example of a communication unit, includes a communication interface for connecting the ECU 5 to the in-vehicle network. The communication interface 51 provides received data for the processor 53, and outputs data provided from the processor 53 to an external device.

The memory 52 includes volatile and nonvolatile semiconductor memories. The memory 52 stores various types of data used for processing by the processor 53, such as values specifying the predetermined area for determination of a state of careless driving based on the movement area in which the movement values are distributed, and changing rules for changing the predetermined area; these rules are set for each road condition. The memory 52 also stores various application programs, such as a state determining program for executing the state determining process.

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 3:
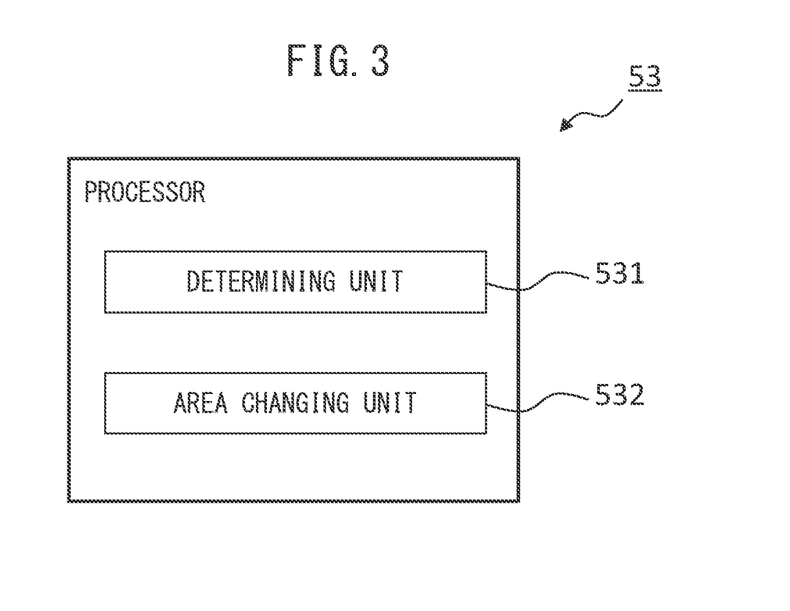
FIG. 3 is a functional block diagram of a processor included in the ECU.

FIG. 3 is a functional block diagram of the processor 53 included in the ECU 5.

The processor 53 of the ECU 5 includes, as its functional blocks, a determining unit 531 and an area changing unit 532. These units included in the processor 53 are functional modules implemented by a program executed on the processor 53, or may be implemented in the ECU 5 as separate integrated circuits, microprocessors, or firmware.

The determining unit 531 obtains an image generated by the driver monitoring camera 2 and detects the looking direction of the driver from the obtained image. The looking direction is expressed as an angle, in a horizontal or vertical plane, between the travel direction of the vehicle 1 and the direction in which the driver is looking.

The determining unit 531 inputs the obtained image into a classifier that has been trained to detect the positions of pupils and reflections of a light source on the cornea, and thereby identifies the positions of pupils and reflections on the cornea in the driver's eyes in the image showing the driver's face. The determining unit 531 then detects the looking direction, based on the positional relationship between the pupils and the reflections on the cornea.

The classifier may be, for example, a convolution neural network (CNN) including multiple layers connected in series from the input toward the output. A CNN that has been trained using inputted face images including pupils and reflections on the cornea as training data operates as a classifier to identify the positions of pupils and reflections on the cornea.

The determining unit 531 may input the obtained image into a classifier to identify the positions of the inner canthi and the irises of the driver's eyes, and detect the looking direction, based on the positional relationship between the inner canthi and the irises. In this case, the driver monitoring camera 2 may include a highly sensitive visible-light sensor that can output an appropriate image showing the driver's face even in the nighttime in the interior of a vehicle.

The determining unit 531 detects the looking direction every capturing period of the driver monitoring camera 2, and determines the movement area in which the looking directions detected at predetermined intervals (e.g. intervals of 15 seconds) are distributed. The determining unit 531 then compares the movement area with the predetermined area stored in the memory 52 and, when the movement area is included in the predetermined area, determines that the driver is in a state of careless driving.

The area changing unit 532 obtains, from the storage device 4, the road condition around the vehicle 1 corresponding to the current position of the vehicle 1 indicated by a positioning signal generated by the GNSS receiver 3. The area changing unit 532 then determines whether the road condition around the vehicle 1 coincides with one of the road conditions stored in the memory 52 in association with the changing rules, and enlarges the predetermined area in accordance with the road condition around the vehicle 1.

Figure 4:
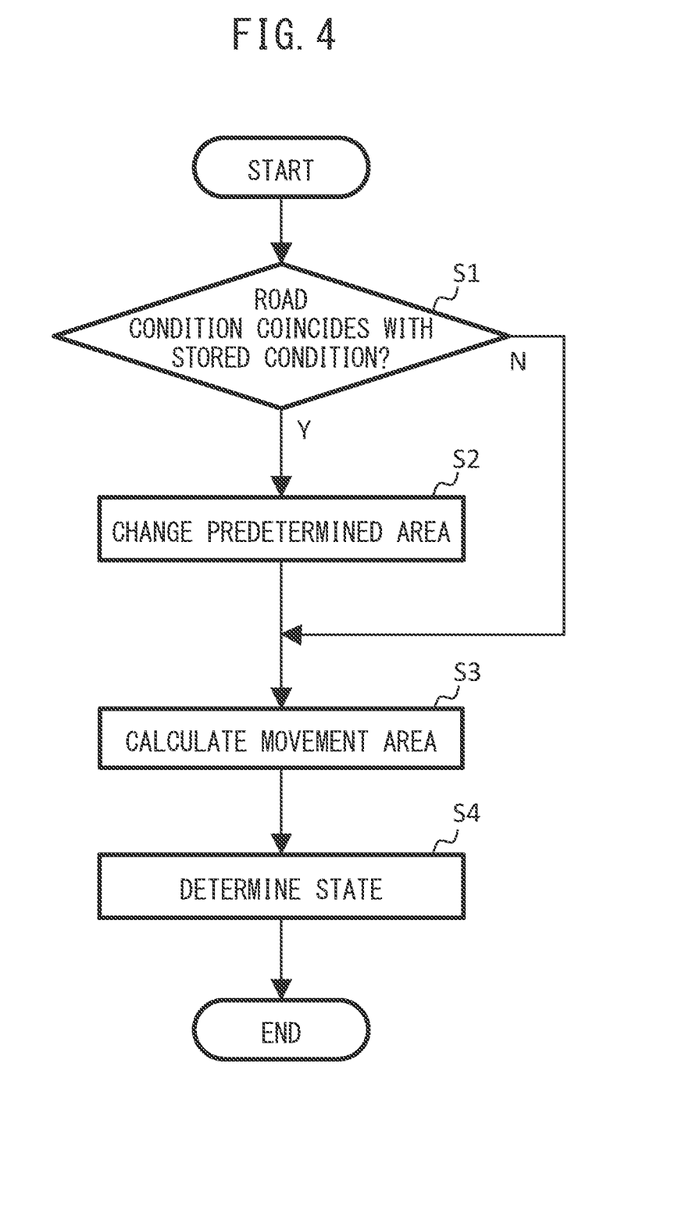
FIG. 4 is a flowchart of a state determining process.

FIG. 4 is a flowchart of the state determining process. The ECU 5 repeats the state determining process every predetermined period during travel of the vehicle 1.

First, the area changing unit 532 determines whether the road condition around the vehicle 1 coincides with one of the road conditions stored in the memory 52 in association with the changing rules (step S1). If it is determined that the road condition around the vehicle 1 coincides with one of the road conditions associated with the changing rules (Yes in step S1), the area changing unit 532 enlarges the predetermined area in accordance with the changing rule associated with this road condition (step S2). If it is determined that the road condition around the vehicle 1 does not coincide with any of the road conditions associated with the changing rules (No in step S1), the area changing unit 532 proceeds to the next step without changing the predetermined area.

Next, the determining unit 531 calculates the movement area in which movement values indicating the looking directions of the driver of the vehicle 1 are distributed (step S3). Subsequently, the determining unit 531 determines whether the driver is in a state of careless driving, using the movement area and the predetermined area stored in the memory 52 (step S4), and then terminates the state determining process.

The processor 53 executes a process to call attention of the driver who is in a state of careless driving, based on the result of determination of the state determining process. For example, the processor 53 outputs a predetermined signal to a display (not shown) mounted on the vehicle 1 to show a message to call attention to driving. Alternatively, the processor 53 may output a predetermined signal to a speaker (not shown) mounted on the vehicle 1 to output voice to call attention to driving.

Figure 5:
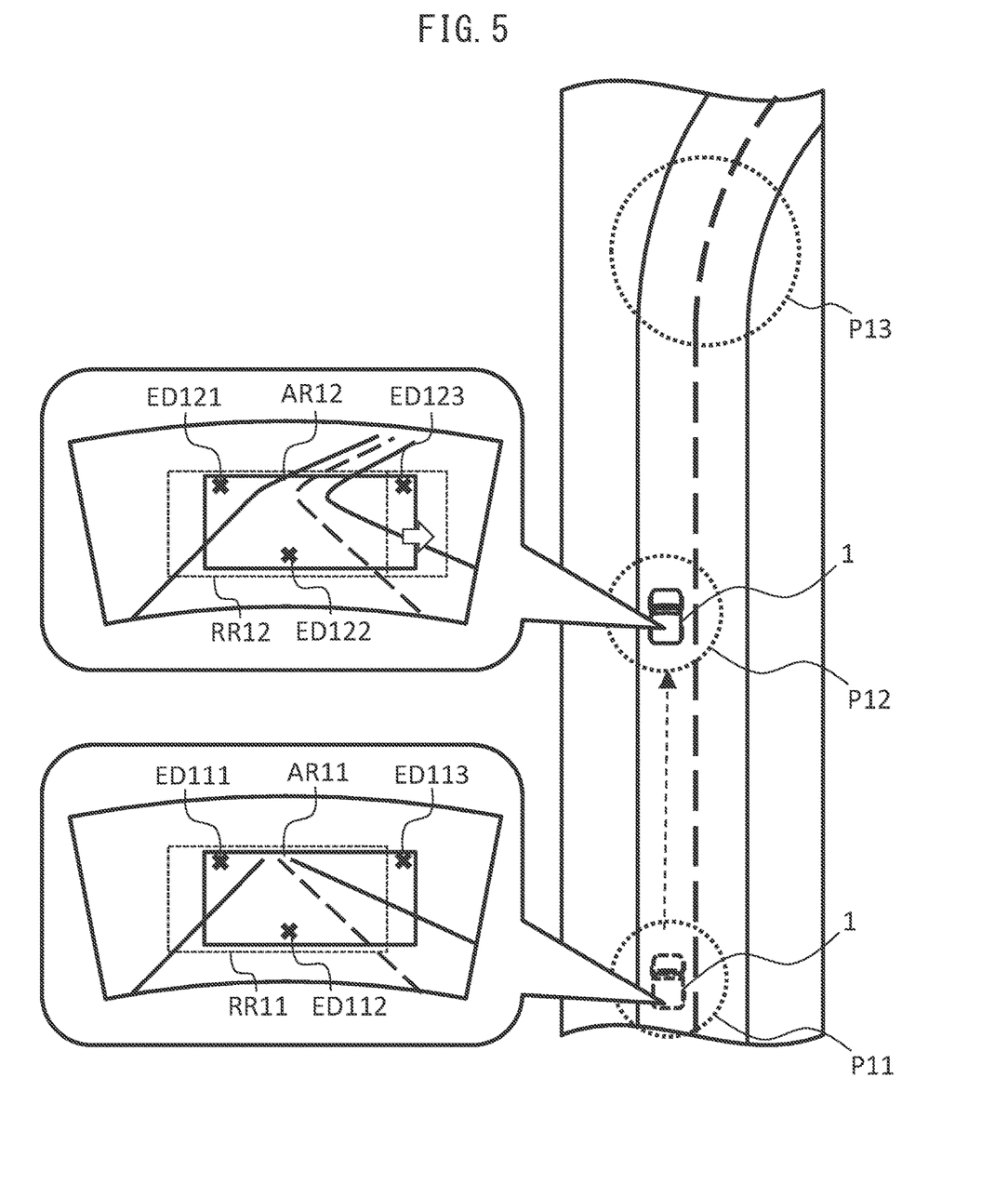
FIG. 5 illustrates a first example of the state determining process.

FIG. 5 is a diagram for describing a first example of the state determining process.

In the first example illustrated in FIG. 5, the vehicle 1 is traveling from a position P11 to a position P12. The road condition around the vehicle 1 at the position P11 corresponds to a straight road. At the position P11, looking directions ED111-ED113 of the driver are detected. In a movement area AR11 in which the looking directions ED111-ED113 are distributed, the looking directions ED111 and ED112 are inside a predetermined area RR11 whereas the looking direction ED113 is outside the predetermined area RR11. In other words, the movement area AR11 is not included in the predetermined area RR11.

The road condition around the vehicle 1 at the position P12 is that there is a curve at a position P13 ahead of the vehicle 1. In association with the road condition that there is a curve ahead of the vehicle 1, the memory 52 stores a changing rule for enlarging the predetermined area toward the curve. In accordance with this changing rule, the area changing unit 532 enlarges the predetermined area RR11 toward the curve (right in the example of FIG. 5).

At the position P12, looking directions ED121-ED123 of the driver are detected. In a movement area AR12 in which the looking directions ED121-ED123 are distributed, the looking direction ED123 is inside an enlarged predetermined area RR12. Hence the movement area AR12 is included in the predetermined area RR12.

In the example of FIG. 5, it is determined that the driver of the vehicle 1 is not in a state of careless driving at the position P11 and is in this state at the position P12.

Figure 6:
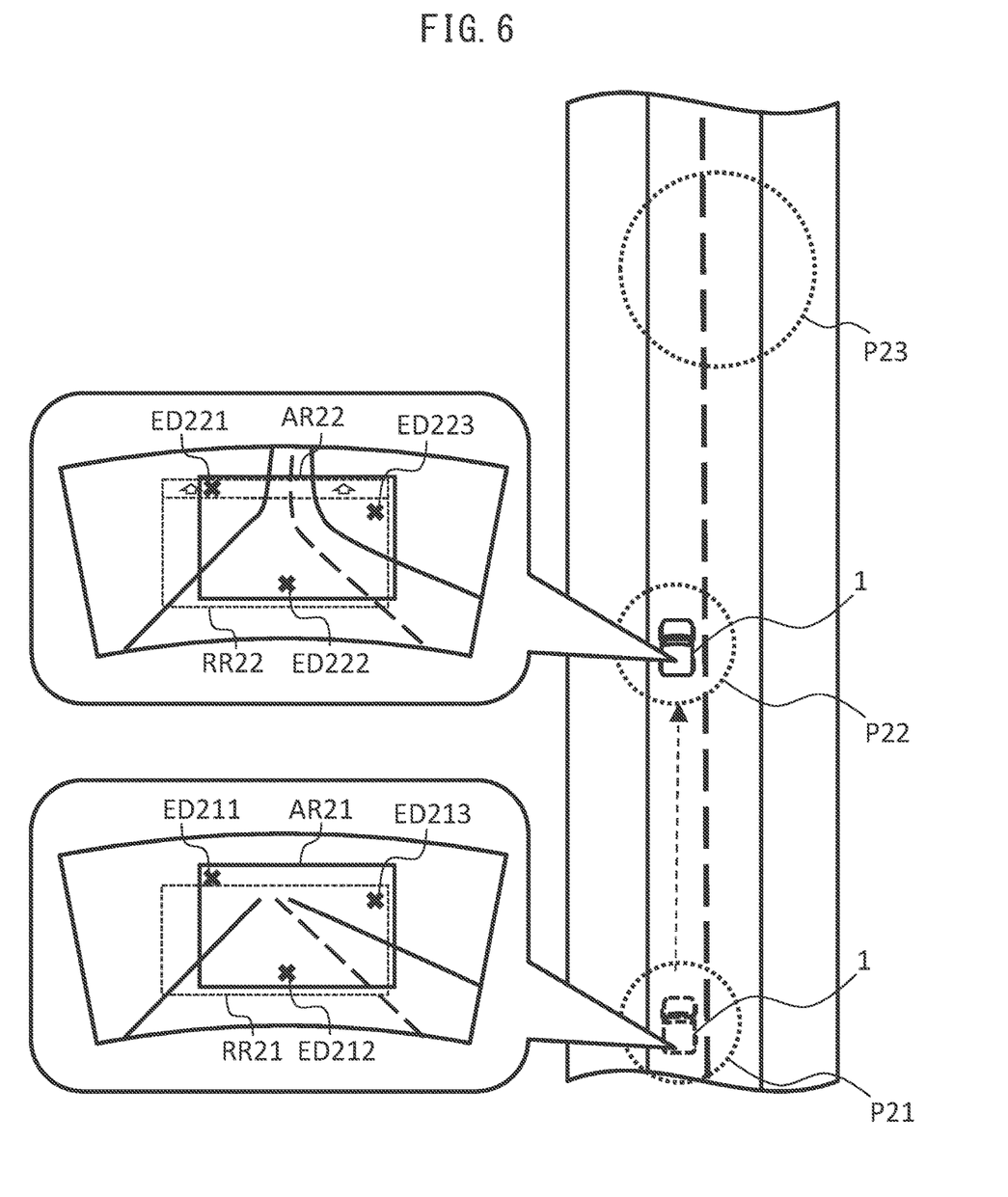
FIG. 6 illustrates a second example of the state determining process.

FIG. 6 is a diagram for describing a second example of the state determining process.

In the second example illustrated in FIG. 6, the vehicle 1 is traveling from a position P21 to a position P22. The road condition around the vehicle 1 at the position P21 corresponds to a straight road. At the position P21, looking directions ED211-ED213 of the driver are detected. In a movement area AR21 in which the looking directions ED211-ED213 are distributed, the looking directions ED212 and ED213 are inside a predetermined area RR21 whereas the looking direction ED211 is outside the predetermined area RR21. In other words, the movement area AR21 is not included in the predetermined area RR21.

The road condition around the vehicle 1 at the position P22 is that the road has a different inclination at a position P23 ahead of the vehicle 1 and slopes upward. However, this inclination is not illustrated in FIG. 6 in which the position P23 is viewed from above. In association with the road condition that the inclination changes ahead of the vehicle 1, the memory 52 stores a changing rule for enlarging the predetermined area toward the side on which the inclination changes. In accordance with this changing rule, the area changing unit 532 enlarges the predetermined area RR21 toward the side on which the inclination changes (upward in the example of FIG. 6).

At the position P22, looking directions ED221-ED223 of the driver are detected. In a movement area AR22 in which the looking directions ED221-ED223 are distributed, the looking direction ED221 is inside an enlarged predetermined area RR22. Hence the movement area AR22 is included in the predetermined area RR22.

In the example of FIG. 6, it is determined that the driver of the vehicle 1 is not in a state of careless driving at the position P21 and is in this state at the position P22.

Figure 7:
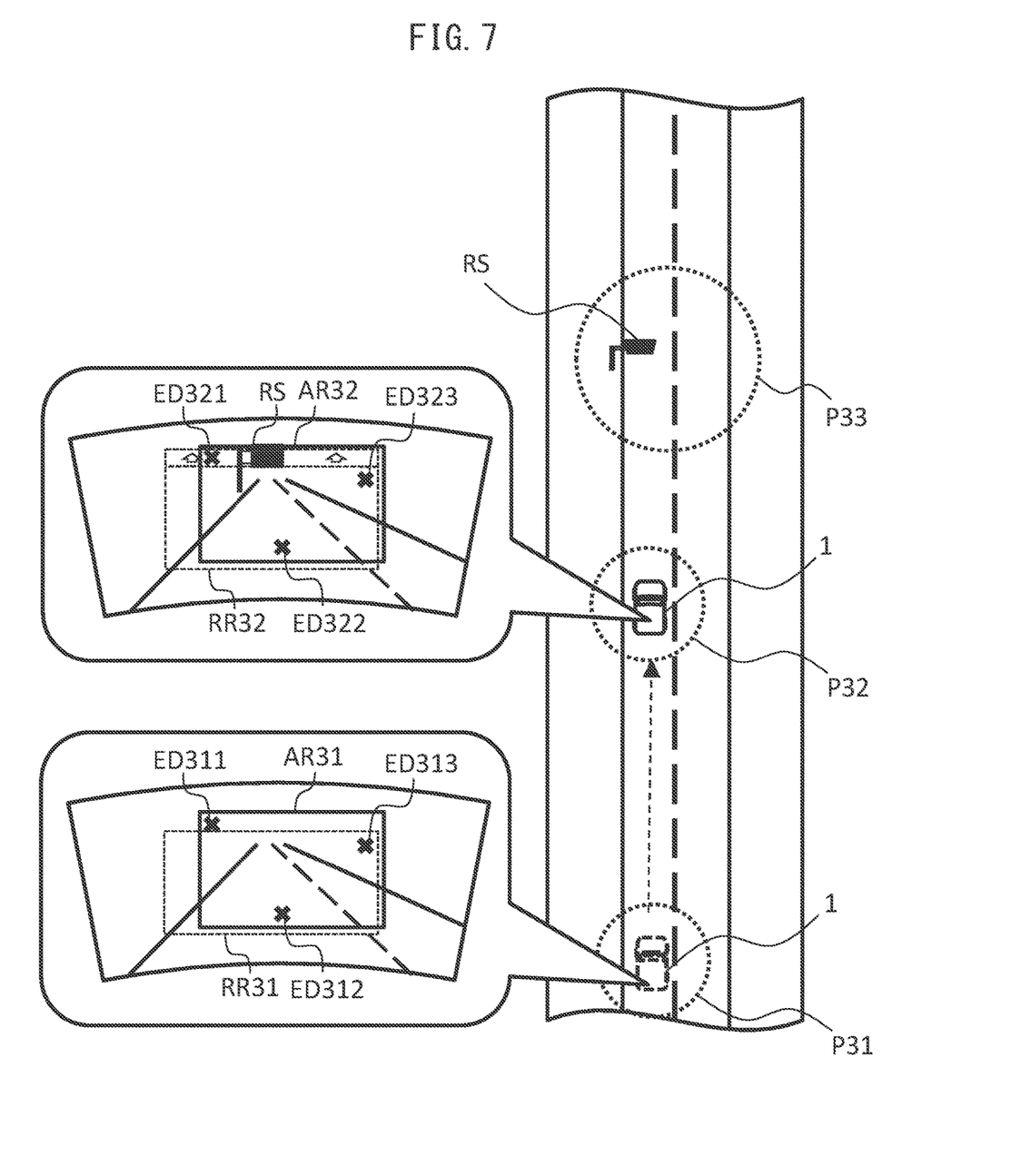
FIG. 7 illustrates a third example of the state determining process.

FIG. 7 is a diagram for describing a third example of the state determining process.

In the third example illustrated in FIG. 7, the vehicle 1 is traveling from a position P31 to a position P32. The road condition around the vehicle 1 at the position P31 corresponds to a straight road. At the position P31, looking directions ED311-ED313 of the driver are detected. In a movement area AR31 in which the looking directions ED311-ED313 are distributed, the looking directions ED312 and ED313 are inside a predetermined area RR31 whereas the looking direction ED311 is outside the predetermined area RR31. In other words, the movement area AR31 is not included in the predetermined area RR31.

The road condition around the vehicle 1 at the position P32 is that a signpost RS or an object is detected at a position P33 ahead of the vehicle 1. In association with the road condition that an object will be detected ahead of the vehicle 1, the memory 52 stores a changing rule for enlarging the predetermined area toward a position where the object will be detected. In accordance with this changing rule, the area changing unit 532 enlarges the predetermined area RR31 toward a position where the signpost RS will be detected (upward in the example of FIG. 7).

At the position P32, looking directions ED321-ED323 of the driver are detected. In a movement area AR32 in which the looking directions ED321-ED323 are distributed, the looking direction ED321 is inside an enlarged predetermined area RR32. Hence the movement area AR32 is included in the predetermined area RR32.

In the example of FIG. 7, it is determined that the driver of the vehicle 1 is not in a state of careless driving at the position P31 and is in this state at the position P32.

Executing the state determining process as describe above, the ECU 5 can appropriately determine the state of driving of a vehicle driver.

According to a modified example, when enlarging the predetermined area in accordance with a road condition that there is a curve ahead of the vehicle 1, the area changing unit 532 may enlarge it toward the curve to a larger extent as the radius of curvature of the curve decreases. The radii of curvature of curves are stored in the storage device 4 as the map information.

According to another modified example, the area changing unit 532 may enlarge the predetermined area in accordance with the road condition around the vehicle 1 to a larger extent as the speed of the vehicle 1 increases. The speed of the vehicle 1 can be obtained from a vehicle speed sensor (not shown) connected to the in-vehicle network.

According to still another modified example, the determining unit 531 may detect the face orientation of the driver of the vehicle 1 from an image generated by the driver monitoring camera 2, instead of or in addition to the looking direction of the driver. The face orientation is expressed as an angle, in a horizontal or vertical plane, between the travel direction of the vehicle 1 and the direction in which the driver's face is oriented. The face orientation can be detected by comparing facial parts, such as the eyes and the mouth, detected from an image with a three-dimensional model of a standard face.

Note that those skilled in the art can apply various changes, substitutions, and modifications without departing from the spirit and scope of the present disclosure.

What is claimed is:

1. An apparatus for accurately determining a state of a driver, comprising a processor and a memory storing computer executable instructions that are executable by the processor to, when a vehicle driven by a driver is on a straight road section, set a predetermined area as an area in which looking directions or face orientations of a driver indicate the driver is in a state of careless driving;

if a road condition around the vehicle changes, enlarge the predetermined area based on the changed road condition;

automatically sense looking directions or face orientations of the driver of the vehicle with camera images received from a driver monitoring camera, automatically determine a movement area in which movement values indicating the looking directions or face orientations of the driver of the vehicle are distributed is included in the enlarged predetermined area, and if the movement area is within the enlarged predetermined area, automatically determine that the diver is in a state of careless driving, and if the movement area is outside the enlarged predetermined area, automatically determine that the driver is not in a state of careless driving.

2. The apparatus according to claim 1, wherein the memory further stores computer executable instructions that are executable by the processor to enlarge, in accordance with the road condition that there is a curve ahead of the vehicle, the predetermined area toward the curve.

3. The apparatus according to claim 2, wherein the memory further stores computer executable instructions that are executable by the processor to enlarge the predetermined area to a larger extent as the radius of curvature of the curve decreases.

4. The apparatus according to claim 1, wherein the memory further stores computer executable instructions that are executable by the processor to enlarge, in accordance with the road condition that the inclination of a road changes ahead of the vehicle, the predetermined area toward a side on which the inclination changes.

5. The apparatus according to claim 1, wherein the memory further stores computer executable instructions that are executable by the processor to enlarge, in accordance with the road condition that an object will be detected ahead of the vehicle, the predetermined area in a direction from the position of the driver to a position where the object will be detected.

6. The apparatus according to claim 1, wherein the memory further stores computer executable instructions that are executable by the processor to enlarge the predetermined area to a larger extent as the speed of the vehicle increases.

7. A method for determining a state, comprising, setting a predetermined area as an area in which looking directions or face orientations of a driver of a vehicle indicate the driver is in a state of careless driving when the vehicle is driven on a straight road section;

enlarging the predetermined area if a road condition around the vehicle changes the enlargement based the changed road condition;

obtaining images of a driver with a driver monitoring camera;

automatically analyzing the obtained images of the driver with a processor according to stored executable program instructions, and if a movement area in which movement values indicating looking directions or face orientations of a driver of a vehicle are distributed is included in the enlarged predetermined area, automatically determining that the driver is in a state of careless driving, and if the movement area is not included in the enlarged predetermined area, automatically determining that the driver is not in a state of careless driving.

* * * * *